Patented Nov. 30, 1943

2,335,823

UNITED STATES PATENT OFFICE 2,335,823

PROCESS OF SEPARATING 3-PICOLINE, 4-PICOLINE, AND 2,6-LUTIDINE

Francis E. Cislak and Frank A. Karnatz, Indianapolis, Ind., assignors to Reilly Tar & Chemical Corporation, Indianapolis, Ind., a corporation of Indiana No Drawing. Application April 28, 1943, Serial No. 484,874

11 Claims. (Cl. 202—42)

Our invention relates to the separation of 3-picoline, 4-picoline, and 2,6-lutidine from one another.

These three compounds, 3-picoline, 4-picoline, and 2,6-lutidine, are commonly associated with one another as ordinarily prepared from coal tar; which ordinary preparation is most commonly by the fractional distillation of crude coal-tar bases and the obtaining of a fraction which includes predominantly these three coal-tar bases. But these three coal-tar bases are difficult to separate one from another, because they boil at very nearly the same temperature—about 143°–144° C.

We have found, contrary to what might be expected, that 3-picoline, 4-picoline, and 2,6-lutidine can be separated from one another by fractional distillation with water; and that if a mixture of all three of these compounds is subjected to fractional distillation with water through a rather efficient fractionating column we first obtain an azeotrope of water and mostly 2,6-lutidine, later (if there was sufficient water present) an azeotrope of water and largely 3-picoline, and finally (again if there is sufficient water present) an azeotrope of water and mostly 4-picoline. The 2,6-lutidine, 3-picoline, and 4-picoline in the several fractions obtained as distillates can if desired be separated from the co-present water, in any convenient manner.

We can use our process of separation to separate mixtures of any two of the three bases, as well as mixtures of all three. In each instance, the mixture, whether of two or three components, is subjected to fractional distillation with water to separate an azeotrope of at least one of the component bases; and then, if desired, the base from any or all separated azeotropes can be freed from the co-present water in any convenient manner.

The following are examples of our process:

Example 1.—One hundred grams of a mixture containing approximately 25% of 2,6-lutidine, 40% of 3-picoline, and 35% of 4-picoline is charged into a still, and 200 to 300 grams of water is added to produce a water solution of the bases 2,6-lutidine, 3-picoline, and 4-picoline. This water solution of bases is subjected to fractional distillation, through an efficient fractionating column, to obtain first the azeotrope of water and 2,6-lutidine, later the azeotrope of water and 3-picoline, and finally (if desired) the azeotrope of water and 4-picoline. These separate azeotropes or any of them may be treated to obtain the respective bases, 2,6-lutidine, 3-picoline, and 4-picoline, in any convenient manner. This is most conveniently done by treatment with caustic soda, in the form of a solid or of a concentrated (70%) solution; upon which treatment, after shaking, two layers form of which the upper is the freed separated base. The freed separated bases thus obtained are usually of a purity of 90% or better, for the 2,6-lutidine, for the 3-picoline, and for the 4-picoline.

Example 2.—The procedure of Example 1 is repeated, save that a mixture containing approximately 45% of 3-picoline and 55% of 4-picoline is used in place of the base mixture of Example 1. In this instance, upon fractional distillation the azeotrope of water and 3-picoline is first obtained, and later (if desired) the azeotrope of water and 4-picoline.

In either of Examples 1 and 2, the fractional distillation may be stopped, if desired, before the azeotrope of water and 4-picoline is distilled over through the fractionating column; and in Example 1 it may be stopped when only the azeotrope of water and 2,6-lutidine has been distilled over through the fractionating column. Whether or not this is done depends upon what final products are desired; and the process may be varied accordingly.

Moreover, the ratio of the bases to the water charged into the still may vary, depending upon the products it is desired to obtain. Thus if it is desired to obtain only a purified 2,6-lutidine by this fractional distillation it is necessary to add only 1 to 1½ parts of water for each part of 2,6-lutidine present in the base mixture; and if it is desired to obtain both 2,6-lutidine and 3-picoline, or to obtain only 3-picoline, it is necessary to add only 1 to 1½ parts of water for each part of 2,6-lutidine and of 3-picoline present in the base mixture.

We prefer to charge both the mixed bases and the water into the still; but we need only charge the mixed bases into the still. In the latter case, steam is then passed through the bases in the still; with or without condensation of the water, depending upon the temperature in the still. If that temperature is high enough, or when it becomes high enough, fractional distillation occurs.

In the foregoing examples we have contemplated using a fractionating column of rather high efficiency. But that high efficiency in a fractionating column is not essential if high purities of the separated components is not important.

We claim as our invention:

1. The process of separating a mixture containing predominantly two or more of the bases 3-picoline, 4-picoline, and 2,6-lutidine, which consists in separating by fractional distillation the water azeotropes of the bases in the mixture.

2. The process of separating a mixture containing predominantly two or more of the bases 3-picoline, 4-picoline, and 2,6-lutidine, which consists in separating by fractional distillation the water azeotropes of the bases in the mixture, and separating at least one of the respective bases from the co-present water.

3. In the process of separating a mixture containing predominantly two or more of the bases 3-picoline, 4-picoline, and 2,6-lutidine, the step which consists in separating from the mixture by fractional distillation the water azeotrope of at least one of the bases in the mixture.

4. In the process of separating a mixture containing predominantly two or more of the bases 3-picoline, 4-picoline, and 2,6-lutidine, the steps which consist in separating from the mixture by fractional distillation the water azeotrope of at least one of the bases in the mixture, and separating the base from the co-present water in at least one such azeotrope.

5. In the process of obtaining separate components of mixtures containing predominantly two or more of the bases 3-picoline, 4-picoline, and 2,6-lutidine, the step of fractionally distilling a water solution of the bases of such mixture.

6. The process as set forth in claim 1, in which the bases in the mixture are predominantly 3-picoline and 4-picoline.

7. The process as set forth in claim 2, in which the bases in the mixture are predominantly 3-picoline and 4-picoline.

8. The process as set forth in claim 3, in which the bases in the mixture are predominantly 3-picoline and 4-picoline.

9. The process as set forth in claim 4, in which the bases in the mixture are predominantly 3-picoline and 4-picoline.

10. The process as set forth in claim 5, in which the bases in the mixture are predominantly 3-picoline and 4-picoline.

11. The process of separating a mixture containing predominantly two or more of the bases 3-picoline, 4-picoline, and 2,6-lutidine, which consists in subjecting such mixture to fractional distillation in the presence of water, and recovering from the fractionating column the water azeotrope of at least one of the bases in the mixture.

FRANCIS E. CISLAK.
FRANK A. KARNATZ.